United States Patent
Pan (10) Patent No.: US 10,261,620 B2
(45) Date of Patent: Apr. 16, 2019

(54) ARRAY SUBSTRATE, DISPLAY PANEL, DISPLAY DEVICE AND METHOD FOR DRIVING ARRAY SUBSTRATE

(71) Applicants: Xiamen Tianma Micro-Electronics Co., Ltd., Xiamen (CN); Tianma Micro-Electronics Co., Ltd., Shenzhen (CN)

(72) Inventor: Chaohuang Pan, Xiamen (CN)

(73) Assignees: Xiamen Tianma Micro-Electronics Co., Ltd., Xiamen (CN); Tianma Micro-Electronics Co., Ltd., Shenzhen (CN)

( * ) Notice: Subject to any disclaimer, the term of this patent is extended or adjusted under 35 U.S.C. 154(b) by 497 days.

(21) Appl. No.: 15/073,647

(22) Filed: Mar. 18, 2016

(65) Prior Publication Data

US 2016/0328076 A1 Nov. 10, 2016

(30) Foreign Application Priority Data

May 8, 2015 (CN) .......................... 2015 1 0232777

(51) Int. Cl.
  *G06F 3/041* (2006.01)
  *G09G 3/36* (2006.01)
  *G06F 3/044* (2006.01)

(52) U.S. Cl.
  CPC .......... *G06F 3/0416* (2013.01); *G06F 3/0412* (2013.01); *G06F 3/044* (2013.01);
  (Continued)

(58) Field of Classification Search
  CPC ...... G06F 3/0416; G06F 3/0412; G06F 3/044; G09G 2310/0291; G09G 3/3677; G09G 2310/0286
  See application file for complete search history.

(56) References Cited

U.S. PATENT DOCUMENTS

2011/0221733 A1 9/2011 Sato
2014/0192019 A1* 7/2014 Fukushima ........... G06F 3/0412
                                                                        345/174
(Continued)

FOREIGN PATENT DOCUMENTS

CN 102750041 A 10/2012
CN 102955637 A 3/2013
(Continued)

*Primary Examiner* — Nitin Patel
*Assistant Examiner* — Amy Onyekaba
(74) *Attorney, Agent, or Firm* — Kilpatrick Townsend & Stockton LLP (57) ABSTRACT

An array substrate, a display panel, a display device and a driving method for an array substrate are disclosed. The array substrate includes a display region and a non-display region. The display region is provided with a plurality of data lines and a plurality of scan lines. The plurality of scan lines intersect with the plurality of data lines to define a plurality of pixel units arranged in an array, and each of the plurality of scan lines is electrically connected with a row of the pixel units. The display region is further provided with N groups of touch electrodes arranged in an array, where N is a positive integer larger than or equal to 2. The non-display region is provided with a driving circuit, and a control unit, and in a touch phase, touch driving signals with inverse polarities are outputted by the control unit to two adjacent groups of the touch electrodes.

20 Claims, 7 Drawing Sheets (52) U.S. Cl.
CPC ... *G09G 3/3677* (2013.01); *G09G 2310/0286* (2013.01); *G09G 2310/0291* (2013.01)

(56) References Cited

U.S. PATENT DOCUMENTS

| | | | |
|---|---|---|---|
| 2015/0277651 A1* | 10/2015 | Zhang | G06F 3/0416 345/173 |
| 2015/0277657 A1* | 10/2015 | Azumi | G06F 3/0416 345/174 |
| 2015/0355765 A1* | 12/2015 | Fukushima | G06F 3/0412 345/174 |
| 2016/0225787 A1* | 8/2016 | Katsuta | H01L 27/124 |

FOREIGN PATENT DOCUMENTS

| | | |
|---|---|---|
| CN | 103092400 A | 5/2013 |
| CN | 104217669 A | 12/2014 |
| CN | 104485081 A | 4/2015 |

* cited by examiner

ARRAY SUBSTRATE, DISPLAY PANEL, DISPLAY DEVICE AND METHOD FOR DRIVING ARRAY SUBSTRATE

CROSS-REFERENCES TO RELATED APPLICATIONS

This application claims priority to a Chinese patent application No. 201510232777.5 filed on May 8, 2015 and entitled "Array Substrate, Display Panel, Display Device And Method For Driving Array Substrate", the disclosure of which is incorporated herein by reference in its entirety.

TECHNICAL FIELD

This disclosure relates to the field of displaying driving technologies including, e.g., a display panel, a display device and a method for driving an array substrate.

BACKGROUND

In the field of displaying technologies, a display function and a touch function are integrated into a display panel for more and more products. The integration of a touch unit and a display unit relates to an "In-cell" mode and an "On-cell" mode. The "In-cell" mode means that the touch function is integrated into liquid crystal pixels, and the "On-cell" mode means that the touch function is integrated into a color filter substrate.

No matter whether the "In-cell" mode or the "On-cell" mode is used, a display panel generally includes at least a driving circuit, a plurality of touch electrodes, touch wires, scan lines, data lines and so on. In a display phase, the driving circuit is configured to scan pixel units via the scan lines, and to transmit display data signals to the turned-on pixel units via the data lines. However, the overlapping structures and the high-integration of the display panel may cause a parasitic capacitance between the touch electrodes and the scan lines, between the touch electrodes and the data lines, between the touch electrodes and the touch wires, and between the electrodes. In a touch phase, the scan lines are disconnected with the driving circuit, and due to the coupling effect between the touch electrodes and the scan lines, the electric potentials of the scan lines would be pulled to be the same as the electric potentials of the touch electrodes, causing a leak current by the pixel units, so that the touch electrodes in different layers will be subject to a heavy load, thus leading to an abnormal picture display.

SUMMARY

The following is a brief summary of subject matter that is described in greater detail herein. This summary is not intended to be limiting as to the scope of the claims. In an example embodiment of one or more inventions described herein, an array substrate, a display panel, a display device and a method for driving an array substrate is provided.

A first aspect provides a method for driving an array substrate, where the array substrate includes a display region and a non-display region; where the display region is provided with a plurality of data lines and a plurality of scan lines, where the plurality of data lines are intersected with the plurality of scan lines to define a plurality of pixel units arranged in an array, and each of the plurality of scan lines is electrically connected with a row of the pixel units; and the display region is further provided with N groups of touch electrodes arranged in an array, where N is a positive integer larger than or equal to 2;

the non-display region is provided with a driving circuit, where the driving circuit includes a plurality of clock control switch units, a plurality of shift registers, and a control unit, where the plurality of clock control switch units and the plurality of the scan lines are provided with a one-to-one correspondence, and the plurality of shift registers and the plurality of clock control switch units are provided with a one-to-one correspondence, control terminal of each of the clock control switch units is connected to the control unit, an input terminal of each of the clock control switch units is connected to a scan signal outputting terminal of the corresponding shift register, and an output terminal of each of the clock control switch units is connected to the corresponding scan line; and the method includes: in a touch phase, the control unit outputting touch driving signals with inverse polarities to two adjacent groups of the touch electrodes.

A second aspect provides an array substrate, including a display region and a non-display region, where the display region is provided with a plurality of data lines and a plurality of scan lines, and the plurality of data lines are intersected with the plurality of scan lines to define a plurality of pixel units arranged in an array, where each of the plurality of scan lines is electrically connected with one row of pixel units; and the display region is further provided with N groups of touch electrodes arranged in an array, where N is a positive integer larger than or equal to 2;

the non-display region is provided with a driving circuit, and the driving circuit includes:

a plurality of clock control switch units, a plurality of shift registers and a control unit, where the plurality of clock control switch units and the plurality of the scan lines are provided with a one-to-one correspondence, and the plurality of shift registers and the plurality of clock control switch units are provided with a one-to-one correspondence;

an output terminal of each of the clock control switch units is connected to the corresponding scan line, an input terminal of each of the clock control switch units is connected to a scan signal outputting terminal of the corresponding shift register;

control terminals of the clock control switch units are connected to the control unit; and in a touch phase, the control unit is configured to output touch driving signals with inverse polarities to two adjacent groups of the touch electrodes.

A third aspect provides a display panel, including a color filter substrate and the array substrate according to the second aspect.

A fourth aspect provides a display device, including the display panel according to the third aspect.

Other aspects will be appreciated upon reading and understanding the attached figures and detailed description.

DESCRIPTION OF DRAWINGS

In order to more clearly illustrate the technical solutions of the embodiments of the invention, the drawings used for the description of the embodiments are briefly introduced below. The drawings for the following description only show some embodiments of the invention, and other drawings may also be obtained from the described drawings by those skilled in the art without any creative work.

DETAILED DESCRIPTION OF THE EMBODIMENTS

The technical solutions in the embodiments of the present invention are clearly and completely described below in combination with the drawings. The described embodiments are some instead of all embodiments of the present invention. All other embodiments obtained in light of the described embodiments of the invention by those skilled in the art without any creative work should fall within the protection scope of the present invention.

Figure 1A:
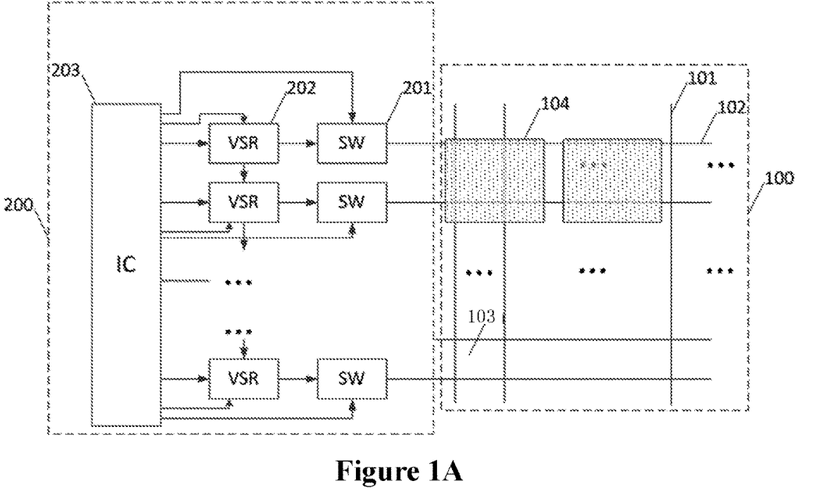
FIG. 1A is a schematic view showing an array substrate provided in an embodiment of the present disclosure.

Reference is made below to FIG. 1A which is a schematic view showing an array substrate provided in an embodiment of the present disclosure. The array substrate includes a display region 100 and a non-display region 200.

The display region 100 can be provided with a plurality of data lines 101 and a plurality of scan lines 102, where the plurality of data lines 101 are intersected with the plurality of scan lines 102 to define a plurality of pixel units 103 arranged in an array, and each of the plurality of scan lines 102 is electrically connected with a row of the pixel units 103 or a column of the pixel units 103. The display region 100 is further provided with N groups of touch electrodes 104 arranged in an array, where N is a positive integer larger than or equal to 2. In addition, in the case that each of the scan lines 102 is electrically connected with a row of pixel units 103, each of the data lines 101 is electrically connected with a column of pixel units 103 since the data lines 101 are intersected with the scan lines 102, as shown in FIG. 1A; or in the case that each of the scan lines 102 is electrically connected with a column of pixel units 103, each of the data lines 101 is electrically connected with a row of pixel units 103 since the data lines 101 are intersected with the scan lines 102.

The non-display region 200 of the array substrate is provided with a driving circuit, where the driving circuit includes a plurality of clock control switch units 201 (e.g. switches, SW), a plurality of shift registers 202 (e.g. vertical shift registers, VSR), and a control unit 203 (e.g. an integrated circuit, IC), where the plurality of clock control switch units 201 and the plurality of the scan lines 102 are provided with a one-to-one correspondence, and the plurality of shift registers 202 and the plurality of clock control switch units 201 are provided with a one-to-one correspondence.

Specifically, each of the clock control switch units 201 includes at least an input terminal, an output terminal and a control terminal, where the control terminal of the clock control switch unit 201 is connected with the control unit 203 to receive a control signal from the control unit 203, the input terminal of the clock control switch unit 201 is connected with a scan signal outputting terminal of the corresponding shift register 202 to receive a scan signal outputted from the shift register 202, and an output terminal of the clock control switch unit 201 is connected to the corresponding scan line 102 to switch a state of the scan line 102.

Specifically, each of the shift registers 202 (i.e. each stage of shift register 202) includes at least a control terminal, a trigger signal inputting terminal, a secondary trigger signal outputting terminal, and a scan signal outputting terminal, where the control terminal of the shift register 202 is connected with the control unit 203 to receive a control signal from the control unit 203, a trigger signal inputting terminal of the shift register 202 is connected to the secondary trigger signal outputting terminal of the preceding shift register 202 to transmit a secondary trigger signal from the preceding shift register 202 to the shift register 202, the scan signal outputting terminal of the shift register 202 is connected with an input terminal of the corresponding clock control switch unit 201 to transmit a scan signal to the clock control switch unit 201, where a trigger signal inputting terminal of an initial shift register 202 from the plurality of shift registers 202 is in direct connected with the control unit 203 to receive a trigger signal transmitted by the control unit 203.

In the above configuration, the control unit 203 of the non-display region 200 of the array substrate is connected with a clock control switch unit 201 through the corresponding shift register 202. The clock control switch unit 201 is connected with the corresponding scan line 102 in the display region 100, so that the control unit 203 turns on and turns off all the pixel units 103 of the display region 100 in a time-division manner in a display phase but turns off all the pixel units 103 of the display region 100 in a touch phase. In the above configuration, the display region 100 of the array substrate further includes the touch electrodes 104, and the control unit 203 is in direct connected with each of the touch electrodes 104 through a touch wire, so that the control unit 203 transmits touch driving signals to the touch electrodes 104 through the touch wires to perform a touch detection and a touch positioning.

An embodiment of the present invention further provides a method for driving an array substrate, and the array substrate is the one described in the above mentioned embodiments. Specifically, the method includes: in a touch phase, touch driving signals with inverse polarities are outputted by the control unit 203 to two adjacent groups of the touch electrodes 104.

Optionally, in the touch phase, the clock control switch unit 201 switches the scan line 102 corresponding to the clock control switch unit 201 into a floating state according to the control signal output from the control unit 203.

In one embodiment, the display region is provided with N groups of touch electrodes 104. In a touch phase, the control unit 203 provides the touch driving signals to the touch electrodes 104, where the touch driving signals received by the touch electrodes 104 are not necessarily identical. Specifically, for two adjacent groups of the touch electrodes 104 from the N groups of touch electrodes 104, touch driving signals with inverse polarities are outputted by the control unit 203 to the two adjacent groups of the touch electrodes 104 through corresponding touch wires in the touch phase; or for any two adjacent groups of touch electrodes 104 from the N groups of touch electrodes 104, touch driving signals with inverse polarities are outputted by the control unit 203 to the any two adjacent groups of the touch electrodes 104 through corresponding touch wires in the touch phase, so as to perform a touch detection and a touch positioning. Meanwhile, in the touch phase, the control unit 203 provides the control signals to the control terminal of the clock control switch unit 201 to control the clock control switch unit 201 to be in a floating state, so that the corresponding scan line 102 connected with the clock control switch unit 201 is also in the floating state.

Optionally, in the touch phase, for each group of the touch electrodes 104, the control unit 203 outputs a touch driving signal, of which the polarity is inverse to the polarity of the touch driving signal outputted in the preceding touch phase, to the group of the touch electrodes 104 through the corresponding touch wire. Therefore, the touch driving signals with inverse polarities are outputted by the control unit 203 to each group of the touch electrodes 104 in two adjacent touch phases, respectively. Furthermore, the touch driving signals with inverse polarities are received by two adjacent groups of the touch electrodes 104, respectively, in a same touch phase.

It should be noted that according to the above configuration with respect to the two adjacent groups of the touch electrodes 104 in two adjacent touch phases controlled by the control unit 203, since the touch driving signals with inverse polarities are received by each of the two adjacent groups of the touch electrodes 104 in two adjacent touch phases, respectively, the coupling effect applied on the scan lines by the group of touch electrodes 104 can be balanced. Further, since the touch driving signals with inverse polarities are received by two adjacent groups of the touch electrodes 104 respectively in a same touch phase, the effect of the parasitic capacitance generated between the two adjacent groups of the touch electrodes 104 can also be balanced.

In a display phase, the control unit 203 transmits the control signal to the clock control switch unit 201 to switch the clock control switch unit 201 into an "On" state, so that the corresponding scan line 102 and the corresponding shift register 202 are turned on and also keep in the "On" state. The control unit 203 simultaneously transmits a clock control signal and a trigger signal to the initial shift register 202 to maintain the initial shift register 202 under a display scan state. When receiving the trigger signal, the initial shift register 202 transmits a scan signal to the corresponding scan line 102 according to the clock control signal, and thus the scan line 102 turns on a corresponding row of pixel units 103 or a corresponding column of pixel units 103, so that the data lines 101 transmit display data signals to the turned-on pixel units 103. As sequentially transmitting the scan signals by the shift registers 202, the corresponding scan line 102 turns on the corresponding row of pixel units 103 or the corresponding column of pixel units 103, so that the data lines 101 transmit the display data signals to at least one turned-on corresponding pixel unit 103.

As described above, the clock control switch unit 201 switches the scan line 102 into a floating state in a touch phase, in order to eliminate the effect of the parasitic capacitance generated between the scan lines 102 and the touch electrodes 104, thereby reducing the touch load. Also, the control unit 203 outputs touch driving signals with inverse polarities to two adjacent groups of touch electrodes 104 so that the polarity of the potential of each group of touch electrodes 104 is reversed, and thus the floated scan line 102 is not coupled to a high-level potential by the touch electrode 104 and is also not coupled to a low-level potential by the touch electrode 104. Instead, the touch driving signals with inverse polarities balance the coupling effect applied on the scan lines 102. The clock control switch unit 201 switches the scan line 102 into the "On" state in the display phase, so that the scan line 102 can normally scan the pixel unit 103 and the array substrate can normally performs a display operation. According to the present disclosure, the array substrate not only performs a normal display operation in the display phase but also the coupling effect applied on the scan lines 102 by the touch electrodes 104 can be balanced, thereby improving the touch performance.

It should be noted that in the method for driving an array substrate, when the control unit 203 transmits touch driving signals with inverse polarities to two adjacent groups of touch electrodes in the touch phase, the control unit 203 simultaneously outputs the touch driving signals with inverse polarities to the two adjacent groups of touch electrodes 104, respectively, so that the two adjacent groups of touch electrodes 104 can simultaneously receive the touch driving signals with inverse polarities.

It should be noted that in the method for driving the array substrate, optionally, the amplitude of the touch driving signal is 0~5V, and thereby the inverse polarities of the touch driving signals are +5V and −5V, respectively. In the same touch phase, a high voltage pulse of +5V and a low voltage pulse of −5V are received by the two adjacent groups of touch electrodes 104, respectively, and the group of touch electrodes 104 receive a high voltage pulse of +5V and a low voltage pulse of −5V in two adjacent touch phases, respectively. Optionally, the touch driving signals with inverse polarities of which the amplitude is within a range of 0 to 5V can also be selected.

It should be noted that the display region of an array substrate is provided with N groups of touch electrodes 104 in the present disclosure. Optionally, each group of touch electrodes 104 includes at least one touch electrode 104. In the case that each group of touch electrodes 104 includes one touch electrode 104, touch driving signals with inverse polarities are outputted by the control unit 203 to two adjacent touch electrodes 104 in the touch phase, respectively. In the case that each group of touch electrodes 104 includes a plurality of touch electrodes 104, the control unit 203 outputs the touch driving signals with inverse polarities to two adjacent groups of the touch electrodes 104, respectively. Optionally, each group of touch electrodes 104 may include at least a row of touch electrodes 104; or each group of touch electrodes 104 may include at least a column of touch electrodes 104. In the present disclosure, the group division manner for the touch electrodes 104 may be various, that is, the touch electrodes 104 may be divided into different groups according to different actual requirements, which is not specifically limited herein.

Figure 1B:
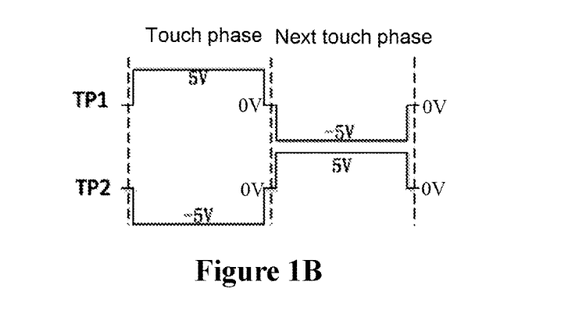
FIG. 1B is a schematic view showing a time sequence of a touch electrode of an array substrate provided in an embodiment of the present disclosure.

Reference is made below to FIG. 1B which is a schematic view showing a time sequence of a touch electrode of an array substrate provided in an embodiment of the present disclosure. The touch electrode 104 is the one in the array substrate described in the above embodiments. The time sequence of the touch electrode 104 is driven by the above-mentioned method for driving the array substrate. In a touch phase, the control unit 203 outputs touch driving signals with inverse polarities to two adjacent groups of touch electrodes 104 (TP1 and TP2), respectively. Optionally, in the next touch phase, the touch unit 203 reverses the polarity of the touch driving signal with respect to that in the preceding touch phase and output the touch driving signal with the reversed polarity to each of the two adjacent groups of touch electrodes 104. Optionally, in the next touch phase, the touch unit 203 outputs the touch driving signal with the polarity identical to that in the preceding touch phase to each of the two adjacent groups of touch electrodes 104, respectively.

After the scan line 102 is switched into a floating state, the potential of the scan line 102 is coupled to the potential of the touch electrode 104. Since the polarities of the potentials of the two adjacent groups of touch electrodes 104 are inverse to each other, the coupling effect applied on the scan line 102 by the touch electrode 104 is balanced, thereby avoiding the possibility that the pixel unit 103 is turned on since the potential of the scan line 102 is coupled to the potential of the touch electrode 104.

Figure 1C:
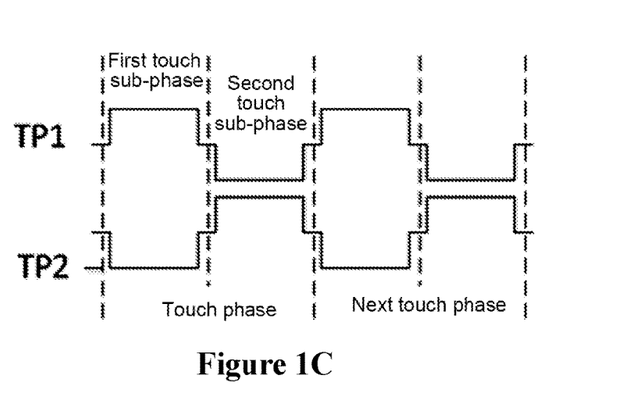
FIG. 1C is a schematic view showing a time sequence of a touch electrode of another array substrate provided in an embodiment of the present disclosure.

Reference is made below to FIG. 1C which is a schematic view showing a time sequence of a touch electrode of another array substrate provided in an embodiment of the present disclosure. The touch electrode 104 is the one in the array substrate described in the above embodiments. The time sequence of the touch electrode 104 is driven by the method for driving the array substrate mentioned above. Optionally, each touch phase can be further divided into a first touch sub-phase and a second touch sub-phase. In the first touch sub-phase, the touch unit 203 outputs touch driving signals with inverse polarities to two adjacent groups of touch electrodes 104, respectively; and in the second touch sub-phase, the touch unit 203 outputs touch driving signals with inverse polarities to two adjacent groups of touch electrodes 104, respectively, where the touch driving signal outputted by the control unit 203 to each of the two adjacent groups of touch electrodes 104 in the second touch sub-phase has a polarity reversed to that in the first touch sub-phase. For each group of touch electrodes 104, the control unit 203 outputs the touch driving signals with inverse polarities to the group of touch electrodes 104 in the first touch sub-phase and the second touch sub-phase, respectively.

It should be noted that each touch phases can be further divided into three or more touch sub-phases. For each group of touch electrodes 104, the control unit 203 outputs touch driving signals with inverse polarities to the group of touch electrodes 104 in two adjacent touch sub-phases, respectively, and outputs touch driving signals with inverse polarities to two adjacent groups of touch electrodes 104 in a touch sub-phase, respectively.

After the scan line is switched into a floating state, the potential of the scan line 102 is coupled to the potential of the touch electrode 104. Since the polarities of the potentials of the two adjacent groups of touch electrodes 104 are inverse to each other, the coupling effect applied on the scan line 102 by the touch electrode 104 is balanced, thereby avoiding the possibility that the pixel unit 103 is turned on since the potential of the scan line 102 is coupled to the potential of the touch electrode 104.

Figure 2A:
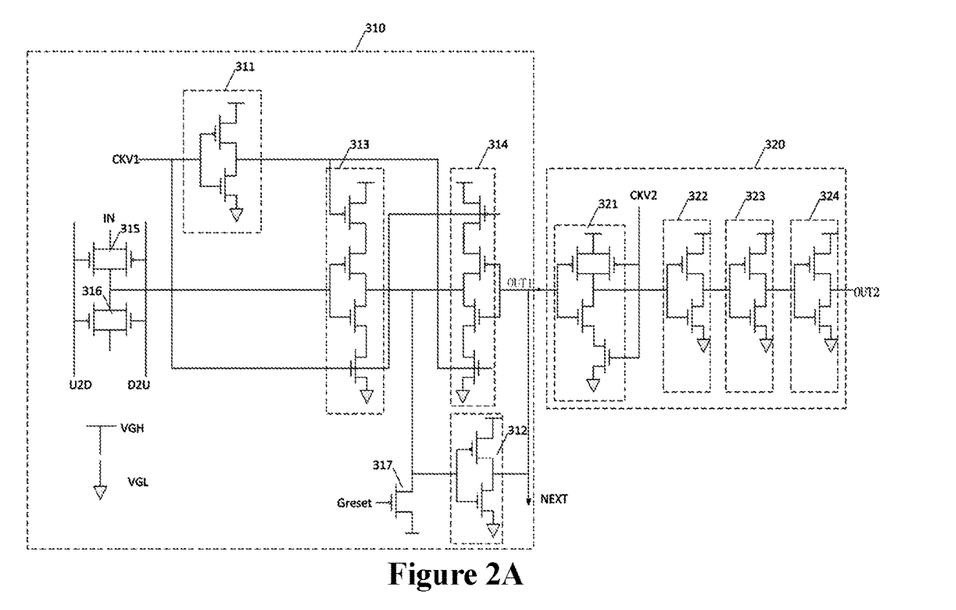
FIG. 2A is a schematic view of a shift register provided in another embodiment of the present disclosure.

Reference is made to FIG. 2A which is a schematic view of a shift register provided in another embodiment of the present disclosure. The shift register 202 is used in the array substrate provided in the above embodiments. Specifically, each shift register 202 of the cascaded shift registers in the array substrate includes a shift unit 310 and a buffer unit 320, where an output terminal OUT1 of the shift unit 310 is electrically connected with a buffer signal inputting terminal of the buffer unit 320, an output terminal OUT2 of the buffer unit 320 is electrically connected with the input terminal of the clock control switch unit 201.

The shift unit 310 includes a first control terminal CKV1 for transmitting a first control signal, a trigger signal inputting terminal IN, a secondary trigger signal outputting terminal NEXT, and a buffer signal outputting terminal OUT1, and the shift unit 310 further includes a reset terminal RE which is connected with the control unit 203 to receive a reset signal GRESET. Optionally, the shift unit 310 specifically includes a first inverter 311, a second inverter 312, a first clock inverter 313, a second clock inverter 314, a first transmission gate 315, a second transmission gate 316, and a P-type transistor 317.

An input terminal of the first inverter 311 (i.e. the first control terminal CKV1 of the shift unit 310) is connected with a control unit 203 to receive a first control signal, an output terminal of the first inverter 311 is connected with a first control terminal of the first clock inverter 313 and an input terminal of the second clock inverter 314, and an input terminal of the first clock inverter 313 and a first control terminal of the second clock inverter 314 are both connected with the control unit 203 to receive the first control signal.

In the shift unit 310 of each of subsequent shift registers 202 except for the initial shift register, an input terminal of the first transmission gate 315 (i.e. the trigger signal inputting terminal IN of the shift unit 310) and an input terminal of the second transmission gate 316 (i.e. the trigger signal inputting terminal IN of the shift unit 310) are both connected with the secondary trigger signal outputting terminal of the preceding shift register 202. In the shift unit 310 of the initial shift register 202, the input terminal IN of the first transmission gate 315 and the input terminal IN of the second transmission gate 316 are both connected with the control unit 203 to receive a trigger signal; a N-type control terminal of the first transmission gate 315 and a P-type control terminal of the second transmission gate 316 are both connected with a U2D; a P-type control terminal of the first transmission gate 315 and an N-type control terminal of the second transmission gate 316 are both connected with the D2U, and an output terminal of the first transmission gate 315 and an output terminal of the second transmission gate 316 are both connected with the second control terminal of the first clock inverter 313.

An output terminal of the first clock inverter 313 and an output terminal of the second clock inverter 314 are both connected with a source electrode of the P-type transistor 317 and an input terminal of the second inverter 312, a gate electrode of the P-type transistor 317 (i.e. the reset terminal RE of the shift unit 310) is connected with the control unit 203 to receive the reset signal GRESET, a drain electrode of the P-type transistor 317 is connected with a high-level transmission line, an output terminal of the second inverter 312 is connected with a second control terminal of the second clock inverter 314, and represents the secondary trigger signal outputting terminal NEXT of the shift unit 310 in order to connect with a trigger signal inputting terminal of the subsequent shift register 202, and also represents the buffer signal outputting terminal OUT1 of the shift unit 310 in order to connect with the buffer signal inputting terminal of the buffer unit 320.

The buffer unit 320 includes at least a second control terminal CKV2 for receiving a second control signal, a buffer signal inputting terminal, and a scan signal outputting terminal OUT2. Optionally, the buffer unit 320 specifically includes a NAND gate 321, a third inverter 322, a fourth inverter 323 and a fifth inverter 324.

A first input terminal of the NAND gate 321 (i.e. the buffer signal inputting terminal of the buffer unit 320) is connected with the buffer signal outputting terminal OUT1 of the shift unit 310, a second input terminal of the NAND gate 321 (i.e. the second control terminal of the buffer unit 320) is connected with the control unit 203 to receive a second control signal, an output terminal of the NAND gate is connected with an input terminal of the third inverter 322, an output terminal of the third inverter 322 is connected with an input terminal of the fourth inverter 323, an output terminal of the fourth inverter 323 is connected with an input terminal of the fifth inverter 324, and an output terminal of the fifth inverter 324 (i.e. the scan signal outputting terminal OUT2) is connected with the input terminal of the clock control switch unit 201.

In summary, the shift register 202 receives the first control signal from the touch unit 203 through the first control terminal CKV1, receives the second control signal from the control unit 203 through the second control terminal CKV2, and receives the trigger signal through the trigger signal inputting terminal IN. Under the control of the control unit 203, the shift register 202 outputs the secondary trigger signal to the next shift register 202 through the secondary trigger signal terminal NEXT, and outputs the scan signal to the connected clock control switch unit 201 through the scan signal outputting terminal OUT2.

Figure 2B:
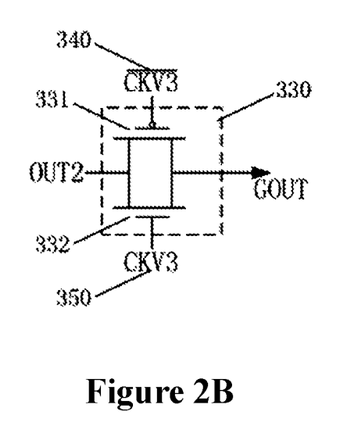
FIG. 2B is a schematic view of a clock control switch unit provided in another embodiment of the present disclosure.

Reference is made below to FIG. 2B which is a schematic view of a clock control switch unit provided in another embodiment of the present disclosure. The clock control switch unit 201 is used in the array substrate according to the above embodiments, and is connected with the shift register 202 as shown in FIG. 2A. The clock control switch units 201 and the scan lines 102 are provided with a one-to-one correspondence, and the output terminal of each of the clock control switch units 201 is connected with the corresponding scan line 102. Also, the clock control switch units 201 and the shift registers 202 are provided with a one-to-one correspondence, and the input terminal of each of the clock control switch units 201 is connected with the scan signal outputting terminal of the corresponding shift register 202. In addition, the clock control switch unit 201 further includes a control terminal connected with the control unit 203. The clock control switch unit 201 is configured to output the scan signal generated by the shift register 202 to the corresponding scan line 102 in the display phase, and switch the corresponding scan line 102 into a floating state in the touch phase.

Optionally, the clock control switch unit 201 specifically includes a transmission gate 330 (a third transmission gate), a first clock control line 340 and a second clock control line 350.

An input terminal of the transmission gate 330 is electrically connected with the scan signal outputting terminal OUT2 of the shift register 202 to receive the scan signal from the shift register 202. An output terminal GOUT of the transmission gate 330 is electrically connected with the corresponding scan line 102 to switch the state of the corresponding scan line 102. The first clock control line 340 is electrically connected to a first clock control terminal $\overline{CKV3}$ of the transmission gate 330, and the second clock control line 350 is electrically connected to a second clock control terminal CKV3 of the transmission gate 330. The first clock control line 340 is electrically connected with the control unit 203 to receive a third control signal from the control unit 203, and the second clock control line 350 is electrically connected with the control unit 203 to receive a fourth control signal from the control unit 203.

Specifically, the transmission gate 330 includes a first transistor 331 and a second transistor 332. A source electrode of the first transistor 331 is connected with a drain electrode of the second transistor 332, and represents an output terminal of the transmission gate 330. A drain electrode of the first transistor 331 and a source electrode of the second transistor 332 are both electrically connected with the scan signal outputting terminal of the shift register 202. A gate electrode of the first transistor 331 is electrically connected with the first clock control line 340, and the a gate electrode of the second transistor 332 is electrically connected with the second clock control line 350, where the first transistor 331 is a positive channel Metal Oxide Semiconductor (PMOS) transistor and the second transistor 332 is a negative channel Metal Oxide Semiconductor (NMOS) transistor.

In a touch phase, the first clock control terminal $\overline{CKV3}$ of the clock control switch unit 201 receives the third control signal from the control unit 203 through the first clock control line 340, and the second clock control terminal CKV3 of the clock control switch unit 201 receives the fourth control signal from the control unit 203 through the second clock control line 350. According to the control signals from the touch unit 203, the clock control switch unit 201 switches the corresponding scan line 102 into a floating state. Specifically, when the control unit 203 outputs a control signal with a high level through the first clock control line 340 and outputs a control signal with a low level through the second clock control line 350, the first control terminal $\overline{CKV3}$ turns off the first transistor 331, the second control terminal CKV3 turns off the second transistor 332, and an output terminal of the transmission gate 330 is in a floating state, so that the scan line 102 connected with the clock control switch unit 201 is in a floating state.

In the display phase, the clock control switch unit 201 switches the corresponding scan line 102 into a conducted state with the corresponding shift register 202 according to the control signals received from the first clock control line 340 and the second clock control line 350, so that the clock control switch unit 201 transmits the scan signal generated by the shift register 202 to the corresponding scan line 102, and the scan line 102 turns on the a corresponding row of pixel units 103 or a corresponding column of pixel units 103, and at least one data line 101 intersected with the scan line 102 transmits a display data signal to the at least one turned-on pixel unit 103. Specifically, when the control unit 203 outputs a control signal with a low level through the first clock control line 340 and outputs a control signal with a high level through the second clock control line 350, the first control terminal $\overline{CKV3}$ turns on the first transistor 331, and the second control terminal CKV3 turns on the second transistor 332 in order to turn on the transmission gate 330, and hence the input terminal and the output terminal of the transmission gate 330 are communicated, so that the clock control switch unit 201 transmits the received scan signal to the corresponding scan line 102.

Optionally, as described above, the transmission gate 330 is added to the output terminal of each of shift registers 202, and the touch unit 203 performs a control operation through the third touch driving signal and the fourth control signal, so that the second control terminal CKV3 is set to be a high level in a display phase (VGH), and the second control terminal CKV3 is set to be a low level in a touch phase (VGL), and all the scan lines 102 are in a floating state in the touch phase, so as to effectively reduce the touch load. Optionally, in the display phase, the first clock control line 340 is supplied with the control signal which is a low-level signal, the second clock control line 350 is supplied with the control signal which is a high-level signal, and hence the transmission gate 330 is turned on. In the touch phase, the first clock control line 340 is supplied with the control signal which is a high-level signal, the second clock control line 350 is supplied with the control signal which is a low-level signal, and hence the transmission gate 330 is turned off.

Figure 2C:
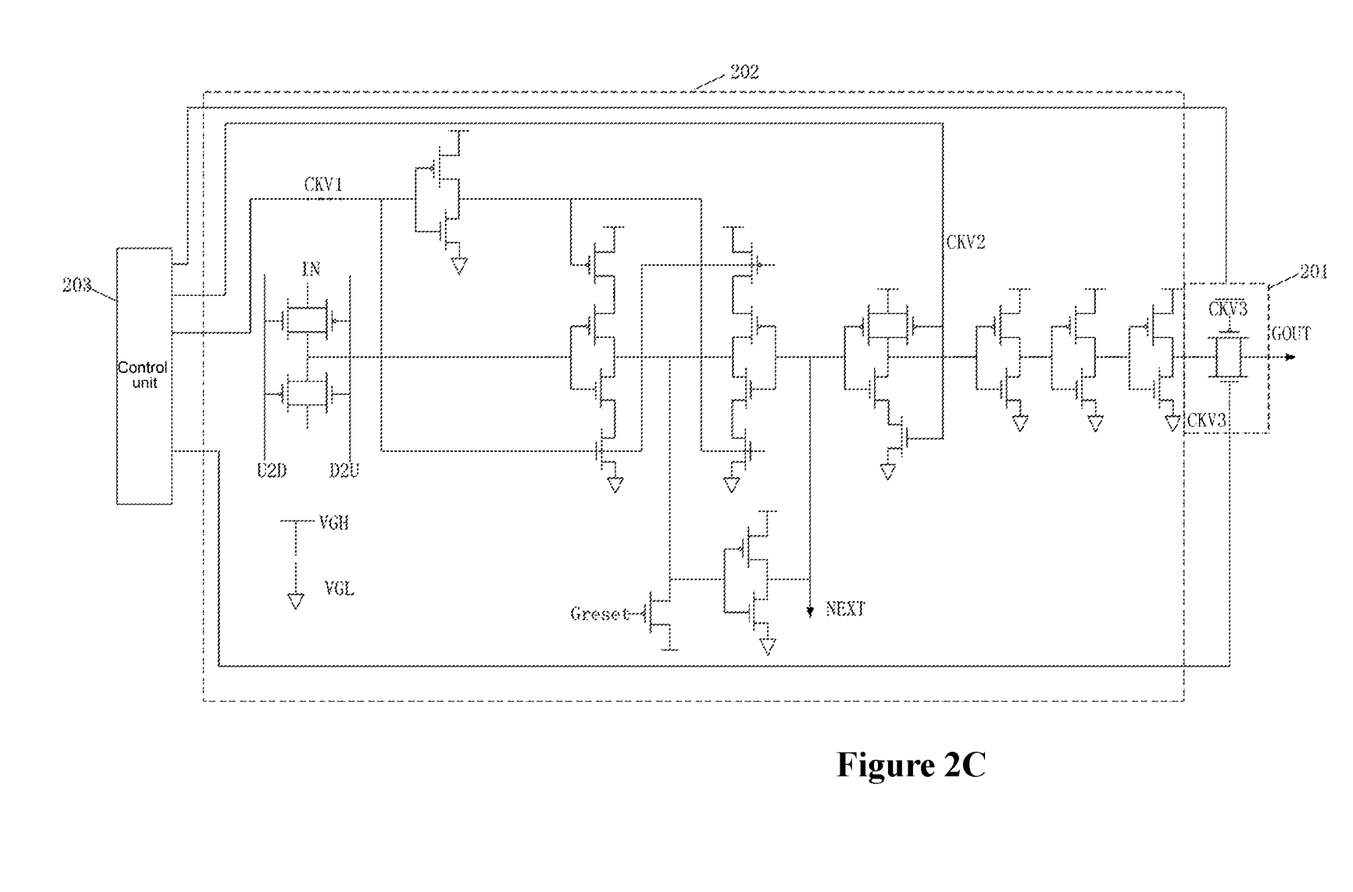
FIG. 2C is a schematic view of a circuitry in a non-display region of an array substrate according to another embodiment of the present disclosure.

Reference is made below to FIG. 2C which is a schematic view of a circuitry in a non-display region of an array substrate according to another embodiment of the present disclosure. As shown in FIG. 2C, in a display phase, a control unit 203 transmits a control signal to a shift register 202. In the case that the shift register 202 is the initial shift register 202, the control unit 203 further transmits an initial trigger signal IN to the shift register 202. Under the control of the control unit 203, the shift register 202 transmits a scan signal to a clock control switch unit 201 and transmits a secondary trigger signal to the next shift register 202. The control unit 203 further transmits the control signal with a low level to the first clock control line 340 of the clock control switch unit 201, and transmits the control signal with a high level to the second clock control line 350 of the clock control switch unit 201. When the control switch unit 201 is turned on, the scan signal is transmitted to the corresponding scan line 102 connected with the clock control switch unit 201.

In the touch phase, the control unit 203 transmits a control signal with a high level to the first clock control line 340 of the clock control switch unit 201 and transmits a control signal with a low level to the second clock control line 350 of the clock control switch unit 201, so that the clock control switch unit 201 is turned off, and the clock control switch unit 201 switches the corresponding scan line 102 connected with the clock control switch unit 201 into a floating state.

Figure 3A:
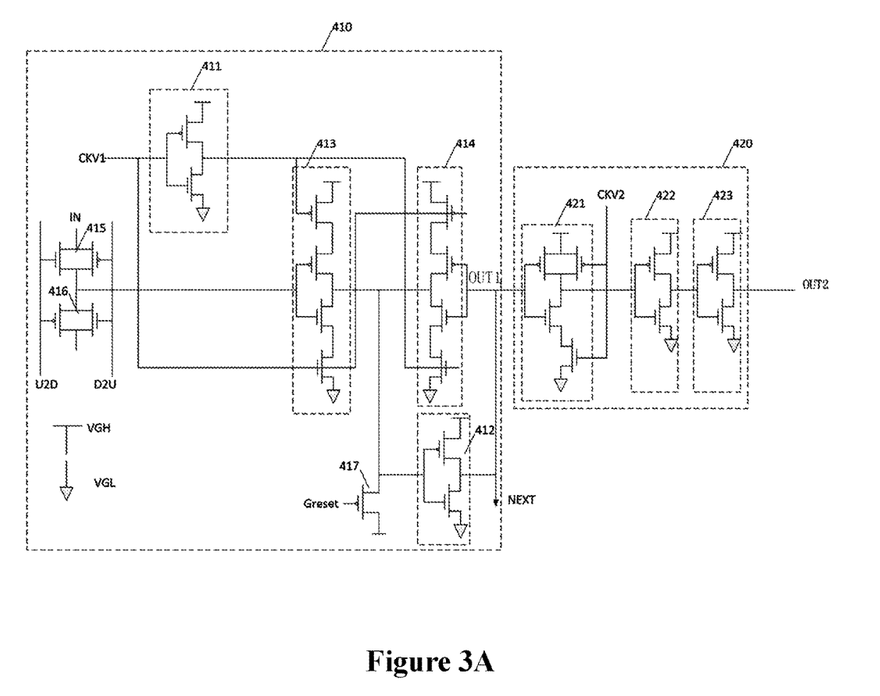
FIG. 3A is a schematic view of a shift register provided in still another embodiment of the present disclosure.

Reference is made below to FIG. 3A which is a schematic view of a shift register provided in still another embodiment of the present disclosure. The shift register 202 is used in an array substrate provided in the above embodiments. Specifically, each shift register 202 of the cascaded shift registers in the array substrate includes a shift unit 410 and a buffer unit 420, where an output terminal OUT1 of the shift unit 410 is electrically connected with a buffer signal inputting terminal of the buffer unit 420, an output terminal OUT2 of the buffer unit 420 is electrically connected with the input terminal of the clock control switch unit 201.

The shift unit 410 includes a first control terminal CKV1 for transmitting a first control signal, a trigger signal inputting terminal IN, a secondary trigger signal outputting terminal NEXT, and a buffer signal outputting terminal OUT1, and the shift unit 410 further includes a reset terminal RE which is connected with the control unit 203 to receive a reset signal GRESET. Optionally, the shift unit 410 specifically includes a first inverter 411, a second inverter 412, a first clock inverter 413, a second clock inverter 414, a first transmission gate 415, a second transmission gate 416 and a P-type transistor 417.

An input terminal of the first inverter 411 (i.e. the first control terminal CKV1 of the shift unit 410) is connected with a control unit 203 to receive a first control signal, an output terminal of the first inverter 411 is connected with a first control terminal of the first clock inverter 413 and an input terminal of the second clock inverter 414, and an input terminal of the first clock inverter 413 and a first control terminal of the second clock inverter 414 are both connected with the control unit 203 to receive the first control signal.

In the shift unit 410 of each of the subsequent shift registers 202 except for the initial shift register, an input terminal of the first transmission gate 415 (i.e. the trigger signal inputting terminal IN of the shift unit 410) and an input terminal of the second transmission gate 416 (i.e. the trigger signal inputting terminal IN of the shift unit 410) are both connected with the secondary trigger signal outputting terminal of the preceding shift register 202. In the shift unit 410 of the initial shift register 202, the input terminal IN of the first transmission gate 415 and the input terminal IN of the second transmission gate 416 are both connected with the control unit 203 to receive a trigger signal; a N-type control terminal of the first transmission gate 415 and a P-type control terminal of the second transmission gate 416 are both connected with a U2D; a P-type control terminal of the first transmission gate 415 and an N-type control terminal of the second transmission gate 416 are both connected with the D2U, and an output terminal of the first transmission gate 415 and an output terminal of the second transmission gate 416 are both connected with the second control terminal of the first clock inverter 413.

An output terminal of the first clock inverter 413 and an output terminal of the second clock inverter 414 are both connected with a source electrode of the P-type transistor 417 and an input terminal of the second inverter 412, a gate electrode of the P-type transistor 417 (i.e. the reset terminal RE of the shift unit 410) is connected with the control unit 203 to receive the reset signal GRESET, a drain electrode of the P-type transistor 417 is connected with a high-level transmission line, an output terminal of the second inverter 412 is connected with a second control terminal of the second clock inverter 414 and represents the secondary trigger signal outputting terminal NEXT of the shift unit 410 to connect with a trigger signal inputting terminal of the next shift register 202, and also represents the buffer signal outputting terminal OUT1 of the shift unit 410 to connect with the buffer signal inputting terminal of the buffer unit 420.

The buffer unit 420 includes at least a second control terminal CKV2 for receiving a second control signal, a buffer signal inputting terminal, and a scan signal outputting terminal OUT2. Optionally, the buffer unit 420 specifically includes a NAND gate 421, a third inverter 422, and a fourth inverter 423.

A first input terminal of the NAND gate 421 (i.e. the buffer signal inputting terminal of the buffer unit 420) is connected with the buffer signal outputting terminal OUT1 of the shift unit 410, a second input terminal of the NAND gate 421 (i.e. the second control terminal of the buffer unit 420) is connected with the control unit 203 to receive a second control signal, an output terminal of the NAND gate 421 is connected with an input terminal of the third inverter 422, an output terminal of the third inverter 422 is connected with an input terminal of the fourth inverter 423, an output terminal of the fourth inverter 423 (i.e. the scan signal outputting terminal OUT2) is connected with the input terminal of the clock control switch unit 201.

In summary, the shift register 202 receives the first control signal from the touch unit 203 through the first control terminal CKV1, receives the second control signal from the control unit 203 through the second control terminal CKV2, and receives the trigger signal through the trigger signal inputting terminal IN. Under the control of the control unit 203, the shift register 202 outputs the secondary trigger signal to the next shift register 202 through the secondary trigger signal outputting terminal NEXT, and outputs the scan signal to the connected clock control switch unit 201 through the scan signal outputting terminal OUT2.

Figure 3B:
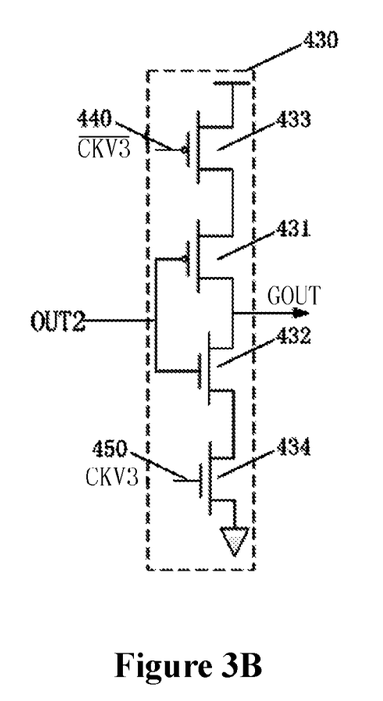
FIG. 3B is a schematic view of a clock control switch unit provided in still another embodiment of the present disclosure.

Reference is made below to FIG. 3B which is a schematic view of a clock control switch unit provided in still another embodiment of the present disclosure. The clock control switch unit 201 is used in the array substrate provided in above embodiments, and is connected with the shift register 202 as shown in FIG. 3A. The clock control switch units 201 and the scan lines 102 are provided with a one-to-one correspondence, and the output terminal of each of the clock control switch units 201 is connected with the corresponding scan line 102. Also, the clock control switch units 201 and the shift registers 202 are provided with a one-to-one correspondence, and the input terminal of each of the clock control switch units 201 is connected with the scan signal outputting terminal of the corresponding shift register 202. In addition, the clock control switch unit 201 further includes a control terminal connected with the control unit 203. The clock control switch unit 201 is configured to output the scan signal generated by the shift register 202 to the corresponding scan lines 102 in the display phase, and switch the corresponding scan line 102 into a floating state in the touch phase.

Optionally, the clock control switch unit 201 specifically includes a clock inverter 430, a third clock control line 440 and a fourth clock control line 450. An input terminal of the clock inverter 430 is electrically connected with the scan signal outputting terminal OUT2 of the shift register 202 to receive the scan signal from the shift register 202. An output terminal GOUT of the clock inverter 430 is electrically connected with the corresponding scan line 102 to switch the state of the corresponding scan line 102. The third clock control line 440 is electrically connected to a first clock control terminal $\overline{CKV3}$ of the clock inverter 430, and the fourth clock control line 450 is electrically connected to a second clock control terminal CKV3 of the clock inverter 430, and both the third clock control line 440 and the fourth clock control line 450 are connected with the control unit 203 to receive control signals from the control unit 203.

Specifically, the clock control switch unit 201 further includes a third transistor 431, a fourth transistor 432, a fifth transistor 433, a sixth transistor 434, a third clock control line 440 and a fourth clock control line 450. The third clock control line 440 and the fourth clock control line 450 are both electrically connected with the control unit 203. A drain electrode of the third transistor 431 is electrically connected to a source electrode of the fifth transistor 433, a source electrode of the third transistor 431 is electrically connected to a drain electrode of the fourth transistor 432 and represents an output terminal of the clock control switch unit 201, a gate electrode of the third transistor 431 is electrically connected to a gate electrode of the fourth transistor 432 and represents the input terminal of the clock control switch unit 201, a source electrode of the fourth transistor 432 is electrically connected to a drain electrode of the sixth transistor 434, a drain electrode of the fifth transistor 433 is electrically connected to a high-level signal line, a gate electrode of the fifth transistor 433 is electrically connected to the third clock control line 440 and represents a first clock control terminal of the clock control switch unit 201, a gate electrode of the sixth transistor 434 is electrically connected to the fourth clock control line 450 and represents a second clock control terminal of the clock control switch unit 201, a source electrode of the sixth transistor 434 is electrically connected to a low-level signal line, where the third transistor 431 and the fifth transistor 433 both are PMOS transistors, and the fourth transistor 432 and the sixth transistor 434 both are NMOS transistors.

In a touch phase, the first clock control terminal of the clock control switch unit 201 receives a control signal from the control unit 203 through the third clock control line 440, the second clock control terminal of the clock control switch unit 201 receives a control signal from the control unit 203 through the fourth clock control line 450. According to the control signals from the touch unit 203, the clock control switch unit 201 switches the corresponding scan line 102 into a floating state. Specifically, when the control unit 203 outputs a control signal with a high level through the third clock control line 440 and outputs a control signal with a low level through the fourth clock control line 450, the first control terminal $\overline{CKV3}$ turns off the fifth transistor 433, the second control terminal CKV3 turns off the sixth transistor 434, and an output terminal of the clock inverter 430 is in a floating state, so that the scan line 102 connected with the clock control switch unit 201 is in a floating state.

In the display phase, the clock control switch unit 201 switches the corresponding scan line 102 into a conducted state with the corresponding shift register 202 according to the control signals received from the third clock control line 440 and the fourth clock control line 450, so that the clock control switch unit 201 transmits the scan signal generated by the shift register 202 to the corresponding scan line 102, and the scan line 102 turns on the a corresponding row of pixel units 103 or a corresponding column of pixel units 103, and at least one data line 101 intersected with the scan line 102 transmits a display data signal to the at least one turned-on pixel unit 103. Specifically, when the control unit 203 outputs a control signal with a low level through the third clock control line 440 and outputs a control signal with a high level through the fourth clock control line 450, the first control terminal $\overline{CKV3}$ turns on the fifth transistor 433, and the second control terminal CKV3 turns on the sixth transistor 434 in order to turn on the clock inverter 430, and hence the input terminal and the output terminal of the clock inverter 430 are communicated, so that the clock control switch unit 201 transmits the received scan signal to the corresponding scan line 102.

In the clock control switch unit 201, the control unit 203 performs a control operation through a third control signal and a fourth control signal. In a display phase, the second control terminal CKV3 is set to be a high level (VGH), and in a touch phase, the second control terminal CKV3 is set to be a low level (VGL). In the touch phase, all the scan lines 102 are in a floating state to effectively reduce the touch load. Optionally, in the display phase, the third clock control line 440 is supplied with the control signal which is a low-level signal, the fifth clock control line 450 is supplied with the control signal which is a high-level signal, and hence the clock inverter 430 is turned on; in the touch phase, the third clock control line 440 is supplied with the control signal which is a high-level signal, the fourth clock control line 450 is supplied with the control signal which is a low-level signal, and the hence clock inverter 430 is turned off.

Figure 3C:
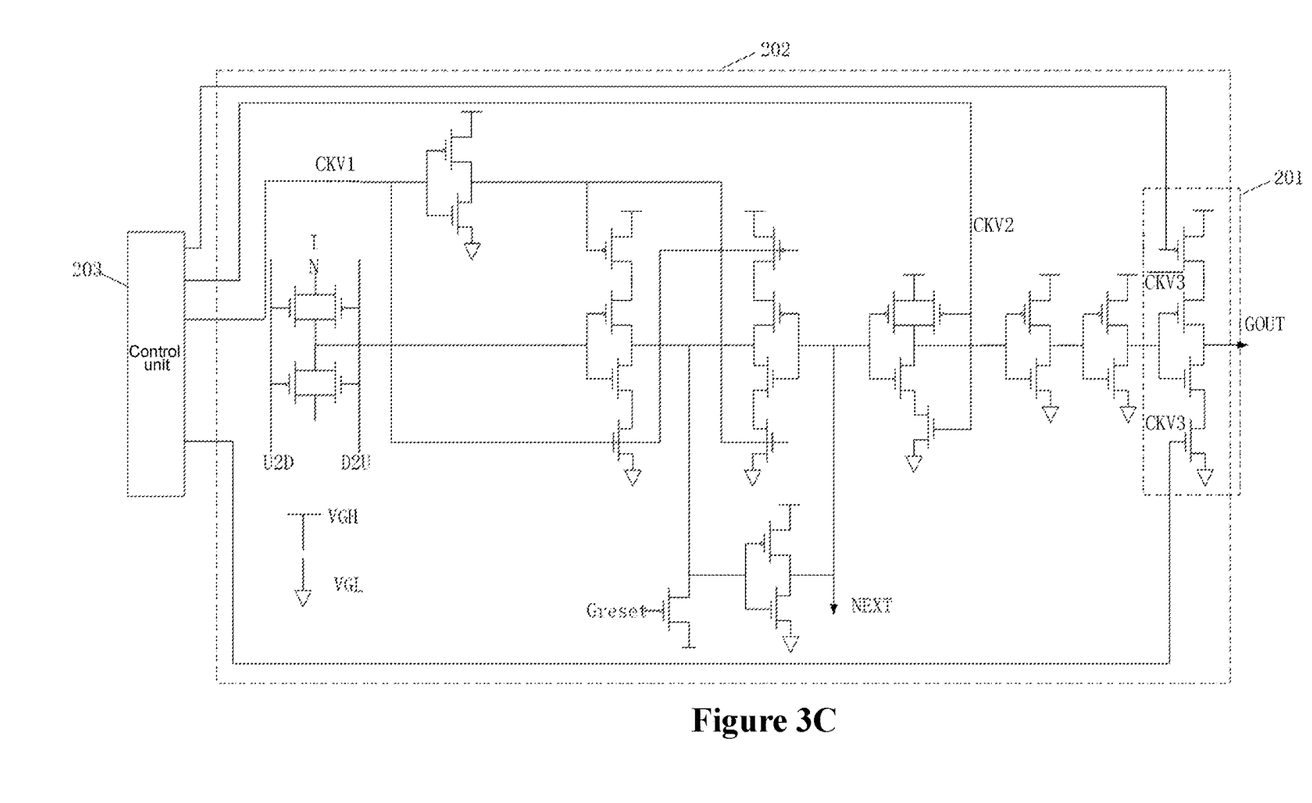
FIG. 3C is a schematic view of a circuitry in a non-display region of an array substrate according to still another embodiment of the present disclosure.

Reference is made below to FIG. 3C which is a schematic view of a circuitry in a non-display region of an array substrate according to another embodiment of the present disclosure. As shown in FIG. 3C, in the display phase, the control unit 203 transmits a control signal to a shift register 202. In the case that the shift register 202 is the initial shift register 202, the control unit 203 further transmits an initial trigger signal IN to the shift register 202. Under the control of the control unit 203, the shift register 202 transmits a scan signal to the clock control switch unit 201 and transmits a secondary trigger signal to the next shift register. The control unit 203 further transmits a control signal with a low level to the third clock control line 440 of the clock control switch unit 201, and transmits a control signal with a high level to the fourth clock control line 450 of the clock control switch unit 201. When the control switch unit 201 is turned on, the scan signal is transmitted to the corresponding scan line 102 connected with the clock control switch unit 201.

In the touch phase, the control unit 203 transmits a control signal with a high level to the third clock control line 440 of the clock control switch unit 201 and transmits a control signal with a low level to the fourth clock control line 450 of the clock control switch unit 201, so that the clock control switch unit 201 is turned off, and the clock control switch unit 201 switches the corresponding scan line 102 connected with the clock control switch unit 201 into a floating state.

It should be noted that for the embodiments mentioned above, the fifth inverter 324 provided in the embodiment shown in FIG. 2A can be optionally adapted to the clock inverter 430 provided in the embodiment shown in FIG. 3B, that is, the fifth inverter 324 provided in the embodiment shown in FIG. 2A can be replaced with the clock inverter 430 provided in the embodiment shown in FIG. 3B, and the clock control switch unit 201 can be arranged in the shift register.

It should be noted that for the embodiments mentioned above, optionally, the clock control switch unit 201 and the shift register 202 are arranged to be separated from each other, and the fourth inverter 423 of the buffer unit 420 of each of shift registers 202 provided in the embodiment shown in FIG. 3A is followed by the clock inverter 430 provided in the embodiment shown in FIG. 3B. Or, alternatively, the clock control switch unit 201 and the shift register 202 can be arranged to be separated from each other, and the fifth inverter 324 of the buffer unit 320 of each of the shift registers 202 provided in the embodiment shown in FIG. 2A is followed by the transmission gate 330.

It should be noted that in any of the above embodiments, the touch electrodes of the array substrate can be obtained by dividing a common electrode. That is, the common electrode can be reused as the touch electrodes. Or alternatively, in any of the above embodiments, the array substrate includes a touch electrode and a common electrode, that is, the common electrode is not reused as a touch electrode.

Another embodiment of the present invention provides a display panel, the display panel includes a color filter substrate and an array substrate which is described in any of the above embodiments. In addition, another embodiment of the present disclosure provides a display device, which includes the above display panel.

It is noted that the embodiments and the applied technology principles of the present disclosure are merely described as above. It should be understood for those skilled in the art that the present disclosure is not limited to particular embodiments described herein. Various apparent changes, readjustment and substitution can be made by those skilled in the art without departing the scope of protection of the present disclosure. Therefore, although the present disclosure is illustrated in detail through the above embodiments, the present disclosure is not merely limited to the above embodiments, and can further include more of other equivalent embodiments without departing the conception of the present disclosure. The scope of the present disclosure is subject to the appended claims.

I claim:

1. A method for driving an array substrate, wherein the array substrate comprises a display region and a non-display region, wherein the display region is provided with a plurality of data lines and a plurality of scan lines, wherein the plurality of data lines intersects with the plurality of scan lines to define a plurality of pixel units arranged in an array, and each of the plurality of scan lines is electrically connected with a row of the pixel units; and the display region is further provided with N groups of touch electrodes arranged in an array, wherein N is a positive integer larger than or equal to 2; and the non-display region is provided with a driving circuit, wherein the driving circuit comprises a plurality of clock control switch units, a plurality of shift registers, and a control unit, wherein the plurality of clock control switch units and the plurality of the scan lines correspond to each other one-to-one, the plurality of shift registers and the plurality of clock control switch units correspond to each other one-to-one, control terminal of each of the clock control switch units is connected to the control unit, an input terminal of each of the clock control switch units is connected to a scan signal outputting terminal of the corresponding shift register, and an output terminal of each of the clock control switch units is connected to the corresponding scan line; and the method comprises: in a touch phase, the control unit outputting touch driving signals with inverse polarities to two adjacent groups of the touch electrodes.

2. The method of claim 1, wherein, in the touch phase, the clock control switch units switch the scan lines corresponding to the clock control switch units into a floating state according to a control signal outputted from the control unit.

3. The method of claim 1, wherein,
the control unit outputs the touch driving signals with inverse polarities to each group of the touch electrodes in two adjacent touch phases, respectively.

4. The method of claim 1, wherein the touch phase comprises a first touch sub-phase and a second touch sub-phase, and the control unit outputs the touch driving signals with inverse polarities to each group of the touch electrodes in the first touch sub-phase and the second touch sub-phase, respectively.

5. The method of claim 1, wherein, each group of the touch electrodes comprises at least one touch electrode, at least one row of the touch electrodes, or at least one column of the touch electrodes.

6. The method of claim 1, wherein, each of the plurality of shift registers comprises a shift unit and a buffer unit;
wherein an output terminal of the shift unit is electrically connected with an input terminal of the buffer unit, an output terminal of the buffer unit is electrically connected with an input terminal of the clock control switch unit; and in a display phase, the clock control switch unit transmits a scan signal generated by the shift register to the corresponding scan line, and in the touch phases, the clock control switch unit switches the corresponding scan line into a floating state.

7. The method of claim 6, wherein
each of the clock control switch units comprises a transmission gate, a first clock control line and a second clock control line, an input terminal of the transmission gate is electrically connected to the output terminal of the buffer unit, the first clock control line is electrically connected to a first control terminal of the transmission gate, the second clock control line is electrically connected to a second clock control terminal of the transmission gate, both the first clock control line and the second clock control line are electrically connected to the control unit, and in the touch phase, the clock control switch unit switches the corresponding scan line to a floating state according to the control signals received through the first clock control line and the second clock control line, and in the display phase, the clock control switch unit transmits the scan signal generated by the shift register to the corresponding scan line according to the control signals received through the first clock control line and the second clock control line.

8. The method of claim 7, wherein, n the display phase, the first clock control line is supplied with the control signal which is a low-level signal, and the second clock control line supplied with the control signal which is a high-level signal;

in the touch phase, the first clock control line is supplied with the control signal which is a high-level signal, and the second clock control line is supplied with the control signal which is a low-level signal.

9. The method of claim 6, wherein, each of the plurality of clock control switch units comprises a clock inverter, a third clock control line and a fourth clock control line; wherein an input terminal of the clock inverter is electrically connected with a scan signal outputting terminal of the shift register, the third clock control line is connected to a first control terminal of the clock inverter, the fourth clock control line is connected to a second control terminal of the clock inverter, and both the third clock control line and the fourth clock control line are connected to the control unit.

10. The method of claim 9, wherein, in the display phase, the third clock control line is supplied with a control signal which is a low-level signal, and the fourth clock control line is supplied with a control signal which is a high-level signal;

in the touch phase, the third clock control line is supplied with a control signal which is a high-level signal, and the fourth clock control line is supplied with a control signal which is a low-level signal.

11. An array substrate, comprising a display region and a non-display region, wherein the display region is provided with a plurality of data lines and a plurality of scan lines, and the plurality of data lines intersects with the plurality of scan lines to define a plurality of pixel units arranged in an array, wherein each of the plurality of scan lines is electrically connected with one row of pixel units; and the display region is further provided with N groups of touch electrodes arranged in an array, wherein N is a positive integer larger than or equal to 2;

the non-display region is provided with a driving circuit, and the driving circuit comprises:

a plurality of clock control switch units, a plurality of shift registers and a control unit, wherein the plurality of clock control switch units and the plurality of the scan lines correspond to each other one-to-one, and the plurality of shift registers and the plurality of clock control switch units correspond to each other one-to-one, an output terminal of each of the clock control switch units is connected to the corresponding scan line, an input terminal of each of the clock control switch units is connected to a scan signal outputting terminal of the corresponding shift register, control terminals of the clock control switch units are connected to the control unit; and in a touch phase, the control unit is configured to output touch driving signals with inverse polarities to two adjacent groups of the touch electrodes.

12. The array substrate of claim 11, wherein, in the touch phase, each of the clock control switch units is configured to switch the corresponding scan line to a floating state according to a control signal outputted from the control unit.

13. The array substrate of claim 11, wherein, the control unit is configured to output the touch driving signals with inverse polarities to each group of the touch electrodes in two adjacent touch phases, respectively.

14. The array substrate of claim 11, wherein, the touch phase comprises a first touch sub-phase and a second touch sub-phase, and the control unit is configured to output the touch driving signals with inverse polarities to each group of the touch electrodes in the first touch sub-phase and the second touch sub-phase, respectively.

15. The array substrate of claim 11, wherein, each group of the touch electrodes comprises at least one touch electrode, at least one row of the touch electrodes, or at least one column of the touch electrodes.

16. The array substrate of claim 11, wherein, each of the plurality of shift registers comprises a shift unit and a buffer unit, and, wherein an output terminal of the shift unit is electrically connected with an input terminal of the buffer unit, an output terminal of the buffer unit is electrically connected with an input terminal of the clock control switch unit, and the clock control switch unit is configured to transmit a scan signal generated by the shift register to the corresponding scan line in a display phase and switches the corresponding scan line to a floating state in the touch phase.

17. The array substrate of claim 16, wherein, each of the plurality of clock control switch units comprises a transmission gate, a first clock control line and a second clock control line; wherein an input terminal of the transmission gate is electrically connected to the output terminal of the buffer unit, the first clock control line is electrically connected to a first control terminal of the transmission gate, the second clock control line is electrically connected to a second control terminal of the transmission gate, and both the first clock control line and the second clock control line are electrically connected to the control unit.

18. The array substrate of claim 17, wherein, the transmission gate comprises a first transistor and a second transistor, wherein a source electrode of the first transistor is electrically connected to a drain electrode of the second transistor and represents an output terminal of the transmission gate; a drain electrode of the first transistor and a source electrode of the second transistor are electrically connected to the output terminal of the buffer unit; a gate electrode of the first transistor is electrically connected to the first clock control line, a gate electrode of the second transistor is electrically to the second clock control line, and the first transistor is a PMOS transistor and the second transistor is a NMOS transistor.

19. The array substrate of claim 16, wherein, each of the plurality of clock control switch units comprises a clock inverter, a third clock control line and a fourth clock control line; wherein an input terminal of the clock inverter is electrically connected with the scan signal outputting terminal of the shift register, the third clock control line is connected to a first control terminal of the clock inverter, the fourth clock control line is connected to a second control terminal of the clock inverter, and both the third clock control line and the fourth clock control line are connected to the control unit.

20. The array substrate of claim 19, wherein, the a clock inverter comprises a third transistor, a fourth transistor, a fifth transistor, and a sixth transistor, and both the third clock control line and the fourth clock control line are electrically connected to the touch unit;

a drain electrode of the third transistor is electrically connected to a source electrode of the fifth transistor, a source electrode of the third transistor is electrically connected to a drain electrode of the fourth transistor and represents an output terminal of the clock control switch unit, a gate electrode of the third transistor is electrically connected to a gate electrode of the fourth transistor and represents the input terminal of the clock control switch unit, a source electrode of the fourth transistor is electrically connected to a drain electrode of the sixth transistor, a drain electrode of the fifth transistor is electrically connected to a high-level signal line, a gate electrode of the fifth transistor is electrically connected to the third clock control line, a gate electrode of the sixth transistor is electrically connected to the fourth clock control line, a source electrode of the sixth transistor is electrically connected to a low-level signal line, wherein the third transistor and the fifth transistor both are PMOS transistors, and the fourth transistor and the sixth transistor both are NMOS transistors.

* * * * *